US006917894B2

(12) United States Patent
Inge (10) Patent No.: US 6,917,894 B2
(45) Date of Patent: Jul. 12, 2005

(54) TIRE PLUS-SIZING SOFTWARE PROGRAM

(76) Inventor: Brian Inge, 13824 Regal Ct., Woodbridge, VA (US) 22193

( * ) Notice: Subject to any disclaimer, the term of this patent is extended or adjusted under 35 U.S.C. 154(b) by 385 days.

(21) Appl. No.: 10/309,667

(22) Filed: Dec. 5, 2002

(65) Prior Publication Data

US 2004/0111276 A1 Jun. 10, 2004

(51) Int. Cl.⁷ ................................................ G06F 3/00
(52) U.S. Cl. ...................................... 702/155; 152/539
(58) Field of Search ........................ 702/155; 152/539, 152/418, 415, 454, 381.6; 301/40.6; 340/444

(56) References Cited

U.S. PATENT DOCUMENTS

| | | | |
|---|---|---|---|
| 5,311,916 A | * | 5/1994 | Fuller ...................... 152/381.6 |
| 5,363,483 A | | 11/1994 | Jones et al. |
| 5,367,627 A | | 11/1994 | Johnson |
| 5,559,484 A | | 9/1996 | Nowicki et al. |
| 5,641,900 A | | 6/1997 | Di Bernardo et al. |
| 5,771,179 A | | 6/1998 | White et al. |
| 5,945,908 A | | 8/1999 | Nowicki et al. |
| 5,969,704 A | | 10/1999 | Green et al. |
| 6,034,676 A | | 3/2000 | Egan et al. |
| RE36,686 E | * | 5/2000 | Benchea ...................... 152/454 |
| 6,598,640 B1 | * | 7/2003 | Reynolds et al. ........... 152/539 |
| 6,637,834 B2 | * | 10/2003 | Elkow ........................ 301/40.6 |

* cited by examiner

Primary Examiner—John Barlow
Assistant Examiner—Xiuqin Sun
(74) Attorney, Agent, or Firm—Richard C. Litman (57) ABSTRACT

A tire plus-sizing software program for receiving data input and displaying data output for six different screens that can be used to correctly determine and convert tire and wheel information to correctly select proper tires and wheels for plus-sizing personal vehicles. The program provides information regarding the types of tires that can be used to "plus-size" tires for a given vehicle, i.e., to increase the wheel diameter without changing the tire diameter. The resulting vehicle with the "plus-sized" tires has improved vehicle performance, handling and appearance when compared with the original equipment wheels and tires.

18 Claims, 12 Drawing Sheets

SIZE IT UP!™

COMPARE TIRE SIZES — 212

- APPLICATION GUIDE
- SPECS FOR 1 TIRE
- COMPARE TIRE SIZES
- TIRE SIZE RECOMMENDATIONS
- LIST OF TIRE SIZES

14

OE TIRE SIZE

| 195 | 65 | 15 |
|-----|----|----|
| 220 | 222 | 224 |

| WIDTH | 7.68" |
| SIDEWALL HEIGHT | 4.99" |
| OVERALL HEIGHT | 24.98" |

232, 236, 234

SUBMIT — 50
RESET — 52

OPTIONAL TIRE SIZE

| 225 | 40 | 18 |
|-----|----|----|
| 226 | 228 | 230 |

| WIDTH | 8.86" |
| SIDEWALL HEIGHT | 3.54" |
| OVERALL HEIGHT | 25.09" |

238, 240, 242

DIFFERENCE

+1.18" — 244
−1.45" — 246
+.11" — 248

BOLT PATTERN CHART — 70

TIRE PLUS-SIZING SOFTWARE PROGRAM

BACKGROUND OF THE INVENTION

1. Field of the Invention

The present invention relates to a software program for displaying tire plus-sizing information. More particularly, the program produces a list of plus-size tires that can be safely used on a vehicle, together with selected wheel specification data, given an original equipment tire size and a desired plus-size wheel diameter.

2. Description of the Related Art

The invention is directed to a software program for assisting a user in selecting appropriate tires and corresponding wheels to "plus-size" tires, i.e., to increase the wheel size while maintaining the tire size. The term "plus-size" is used in the automotive field to indicate that the wheels originally provided with a vehicle are replaced with larger wheels. However, the overall tire diameter must remain substantially the same after plus-sizing in order to avoid problems, most notably incorrect odometer and speedometer readings, or, more seriously, contact of the tire with the wheel well in the vehicle chassis when driving. Therefore, the sidewall height, or section height, of the tire must be decreased to correspond with the increase in wheel size.

Advantages to plus-size tires include: improved overall appearance of the vehicle and improved performance and better handling when driving. The improved performance during driving is related to the smaller air chamber and the smaller sidewall chamber in the plus-sized tires. Also, in order to maintain nearly the same load capacity of the tires required by the vehicle, as determined by the footprint of the tire with the road (i.e., the contact patch area), the tire width may be adjusted accordingly.

Plus-sizing is performed for wheels in increments of 1 inch from 1 inch up to as much as 4 inches. Another term often used alternatively for "plus-size" is "inch-up". Tire vendors sell such plus-sized tires with corresponding wheels that match with the original equipment (OR) specifications of the vehicle.

The software program includes six graphical display screens that receive input and provide various types of output information to the user that are needed for determining the correct tires and wheels for plus-size application.

Although various computer programs exist on the Internet and elsewhere which assist users in selecting appropriate tires for vehicles, none provide key information regarding tire "plus-sizing" in the manner provided in the present invention. The inventive program fulfills a need for both tire and wheel vendors and drivers who seek to plus-size tires and to ensure that the correct wheels are selected to match the plus-size tire with the vehicle.

More particularly, a display screen of the inventive program uses OE tire size and desired wheel size input data in a unique software processing routine that selects three preferred tire sizes from a comprehensive tire size database into a final based upon the vehicle OE tire size and the desired wheel plus-size.

U.S. Pat. No. 5,363,483, issued to Jones et al. on Nov. 8, 1994, teaches a computer system for displaying various graphical objects. U.S. Pat. No. 5,367,627, issued to Johnson on Nov. 22, 1994, teaches a computer program for providing textual and graphical information for use in parts selection. U.S. Pat. No. 5,559,484, issued to Nowicki et al. on Sep. 24, 1996, teaches a data logging tire monitor program.

U.S. Pat. No. 5,641,900, issued to Di Bernardo et al. on Jun. 24, 1997, teaches a computer program that inputs the ground-contacting area of a tire to provide graphical information regarding pressure distribution in the tire. U.S. Pat. No. 5,771,179, issued to White et al. on Jun. 23, 1998, teaches a measurement analysis software system. U.S. Pat. No. 5,945,908, issued to Nowicki et al. on Aug. 31, 1999, teaches a data logging tire monitor.

U.S. Pat. No. 5,969,704, issued to Green et al., teaches a configurable LED matrix display. U.S. Pat. No. 6,034,676 issued to Egan et al. on Mar. 7, 2000 teaches a computer program for measuring and processing tire depth data. European Patent Application No. 547,364A2 issued to Dory et al. teaches an apparatus and software for measuring irregular tread wear.

There exists a need for a computer program that provides information to users regarding tire plus-sizing, including important parameters, such as bolt patterns, OE tire sizes, thread sizes, offsets and hub bore sizes that ensure that the wheel and tire combination safely match the requirements of the vehicle.

None of the above inventions and patents, taken either singly or in combination, is seen to describe the instant invention as claimed. Thus a tire plus-sizing software program solving the aforementioned problems is desired.

SUMMARY OF THE INVENTION

The present invention is directed to a software program for determining correct tire and wheel sizes for plus-size tires. It is generally known in the industry that tires originally provided on new vehicles, i.e., passenger vehicles and small trucks, can be "plus-sized" to improve the vehicle's appearance and handling.

Plus-sizing is accomplished by increasing the size of a wheel while maintaining the overall tire diameter as close to the original diameter as possible.

The inventive program provides six different input/output screens named as follows: "Application Guide" screen, "Specs for 1 Tire" screen, "Compare Tire Sizes" screen, "Tire Size Recommendation" screen, "List of Tire Sizes" screen, and "Bolt Pattern Chart" screen.

The first input/output screen is the Application Guide screen requiring the following inputs: year, make, model of the vehicle; and providing the following outputs: original equipment tire size, expressed in P-metric (or European metric) format, wheel bolt pattern, thread sizes, offset and hub bore size.

The second input/output screen is the Specs for 1 Tire screen requiring the following inputs: tire size, i.e., width in millimeters, aspect ratio, and wheel diameter in inches, expressed as a metric or P-metric, e.g., for a P2254018 tire, the width is 225 mm, the aspect ratio is 40 and the wheel diameter is 18 inches; and providing the following outputs: tire width in inches, sidewall height in inches and overall height in inches.

The third input/output screen is the Compare Tire Sizes screen requiring the following inputs: original equipment (OE) tire size and optional tire size, both expressed as metrics or P-metrics; and providing the following outputs: the tire width in inches, sidewall height in inches and overall height in inches for the original equipment tire size and for the optional tire size, and the differences in width, sidewall height and overall height, all in inches.

The fourth input/output screen is the Tire Size Recommendations screen requiring the following inputs: OE tire size and desired wheel size; and providing the following outputs: width, sidewall height and overall height, all in inches, up to three possible tires that can safely be used, as well as difference in overall height for each of up to three possible matching tires for the desired wheel size compared with the OE tire size. The fourth input/output screen includes a unique processing procedure for displaying up to three possible matching tire sizes reduced from a comprehensive tire size database.

The fifth input/output screen is the List of Tire Sizes screen which displays a set of selectable wheel sizes ranging from 15" to 24" in 1-inch increments and requiring the selection of one of these; and providing, as output, a set of corresponding tires expressed as metrics or P-metrics.

The sixth input/output screen is the Bolt Pattern Chart which accepts no input data and has only one possible display version: a list of existing possible bolt patterns.

Accordingly, it is a principal object of the invention to provide a computer program in which six input-output display screens are used for receiving input and for displaying output and which provide information regarding proper wheels and tires to use in plus-sizing.

It is another object of the invention to provide a computer program as described above for use on the Internet.

It is a further object of the invention to provide a computer program as described for use on a computer.

Still another object of the invention is to provide a computer program as described for use on a personal data assistant.

Still another object of the invention is to provide a computer program as described in which a unique processing procedure is used to determine up to three possible matching tire sizes from a comprehensive tire size database for a given OE tire and desired wheel size.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
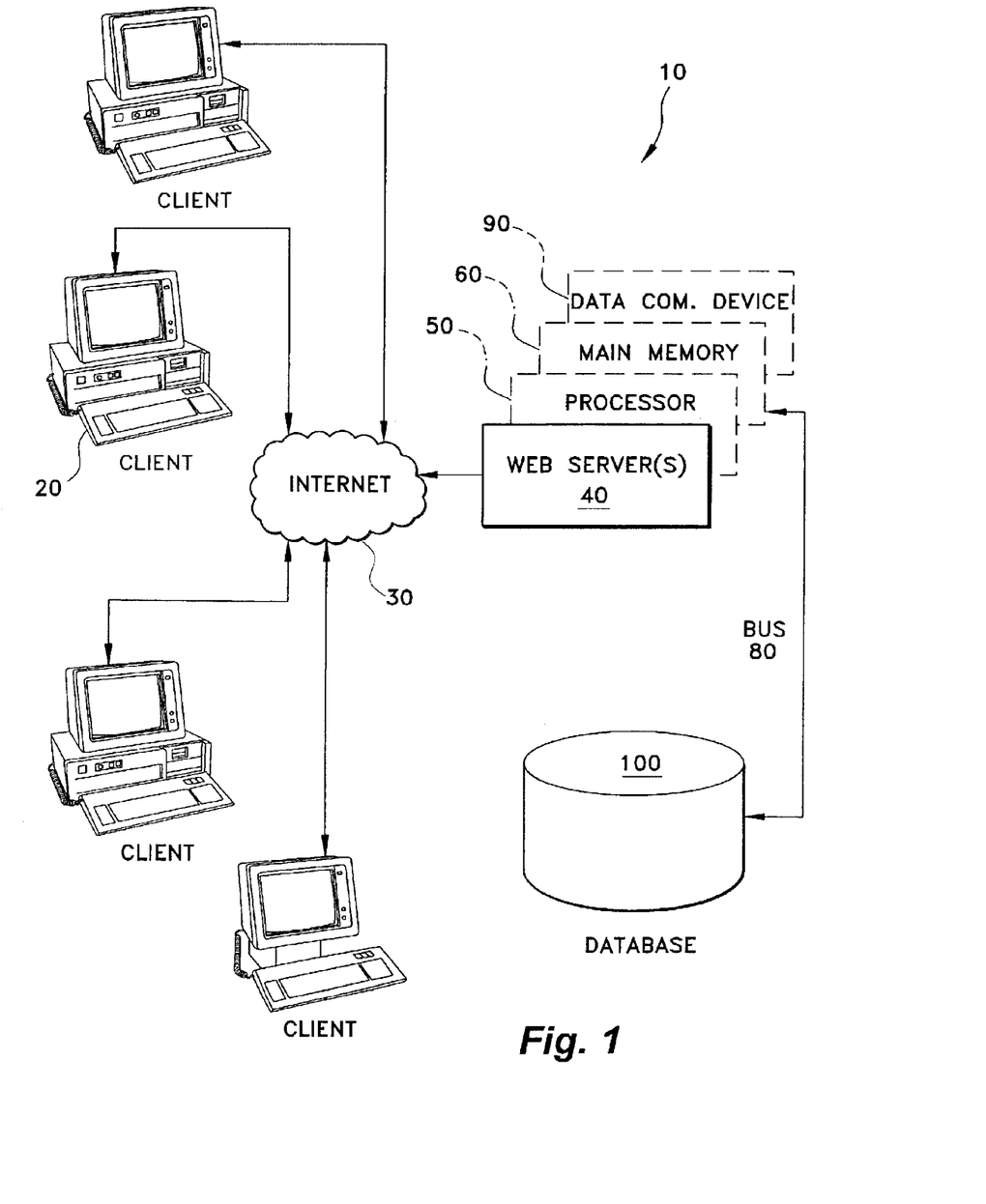
FIG. 1 is block diagram of a network system on which the software program according to the present invention operates.

The present invention is a tire plus-sizing computer program for recommending tire sizes when substituting a larger wheel for the original equipment wheel in a motor vehicle. The computer program may operate on a network system 10, of which a representative example is shown in FIG. 1, or as a stand alone application for operation on an individual work station. Referring to FIG. 1, the computerized system 10 uses a client-server model, including a plurality of clients 20 connected to a Web server 40 through a computer network, preferably the Internet 30, although the computerized system 10 may also operate on an intranet or extranet, or, as a stand alone application on a hand-held personal data assistant or desktop or laptop personal computer. The Web server 40 has a processor 50 for processing instructions and an area of main memory 60 for executing program code under the direction of the processor 50 connected by a bus 80. The client computer 20, or a stand alone work station when the computer program is not operated through a network, includes a conventional display device (monitor or LCD display) and data entry device (keyboard and optional mouse).

The computerized system 10 also includes at least one relational database 100 for storing data; in this case, the relational database stores a comprehensive set of tire data, in which each tire data value includes: tire width, sidewall height, and overall height. Furthermore, the database also stores a separate comprehensive set of wheel/hub parameters for vehicles including wheel size, bolt pattern, thread size, and offset for corresponding vehicle parameters including vehicle make, year and model. The relational database also stores original equipment (OE) tire data-corresponding to the vehicle parameters: make, model and year.

The relational database 100 may reside in an area of disk storage on the Web server 40 and be connected to the main memory 60 by the bus 80, or may reside on a remote database server 100 accessible by the Web server 40, as is known in the art. A data communications device 90 is connected to the server 40 by bus 80 for connecting the Web server 40 to the Internet 30. The client computers 20 have a Web browser operable thereon for receiving and viewing documents written in hypertext markup language (HTML) and transmitted over the Internet 30 via hypertext transfer protocol (HTTP) by the Web server 40 and transmitting requests for HTML documents to the Web server via HTTP.

The present invention is more specifically directed to a software program providing six different input/output screens that can receive data input and display output.

The present invention includes software program code stored on a computer readable medium and is operable in main memory 60 on the Web server 40 for displaying the appropriate output information for each of the six different screens that correspond to the input information provided by the user.

Normally, tire sizes are expressed as P-metrics, i.e., the capital letter "P" (corresponding to "passenger" vehicles) followed by a set of numbers. The P-metric is a value that is in a standard format for all tires sold in the United States. It is typically provided along the sidewall of each tire. For European tires, however, the values are referred to simply as "metrics", i.e., they are expressed without the preceding letter "P". The present software program contemplates the input and output data being either in P-metric or metric, depending, for example, upon the particular country of use of the software program.

Figure 9A:
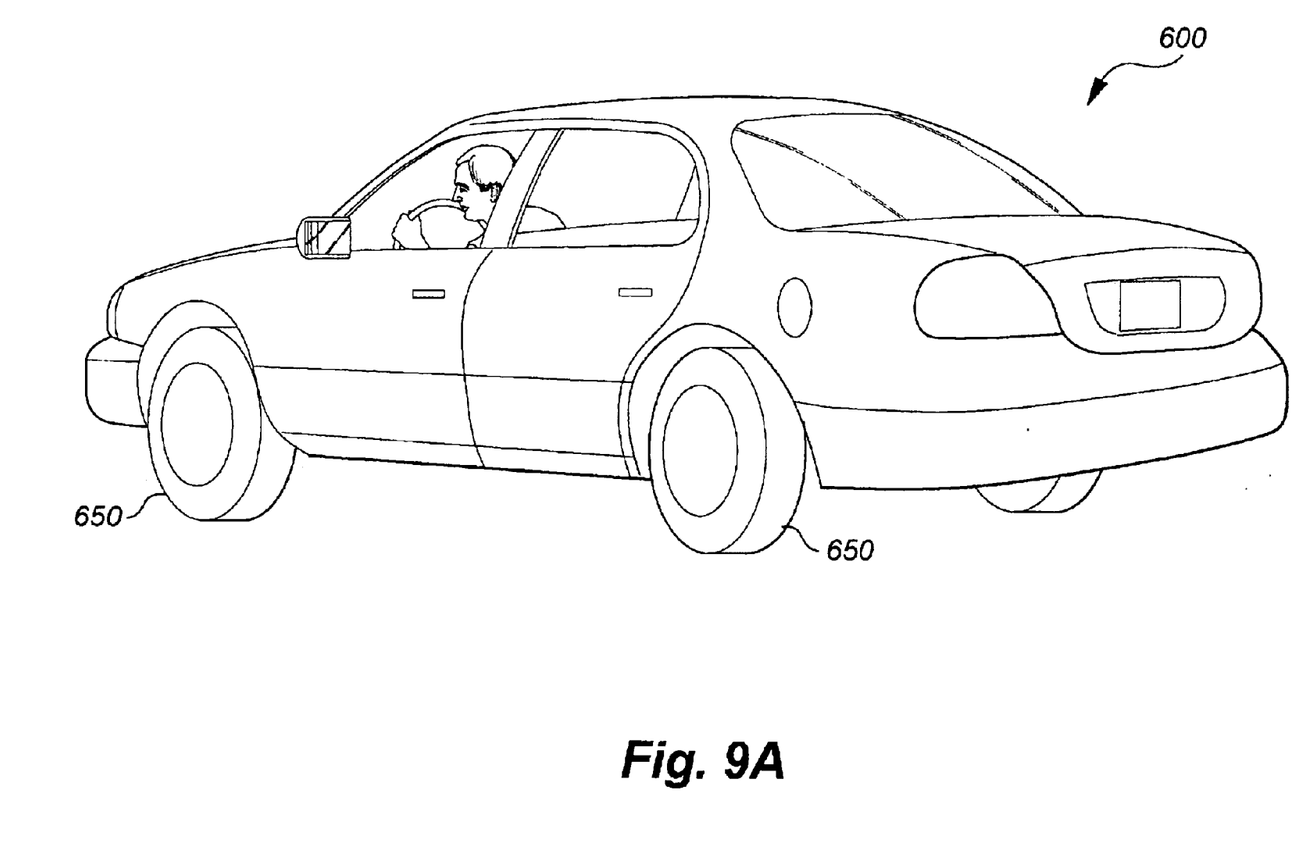
FIGS. 9A and 9B show perspective views of a vehicle without and with "plus-sized" tires, respectively.
Figure 9B:
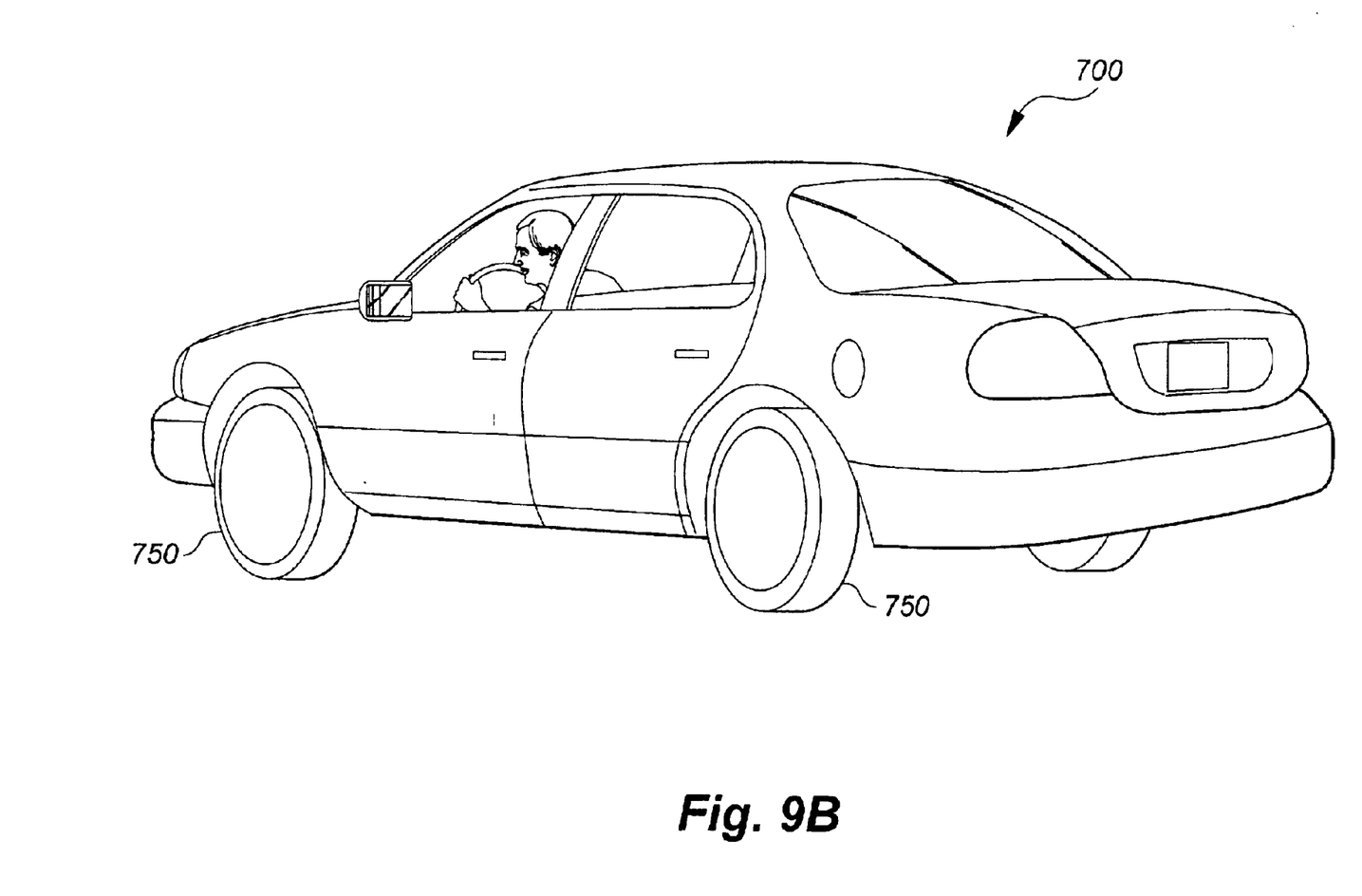

FIGS. 9A and 9B show a vehicle, 600 and 700, with standard, 650, and plus-sized tires, 750, respectively. The difference in overall appearance is clearly shown.

Figure 2A:
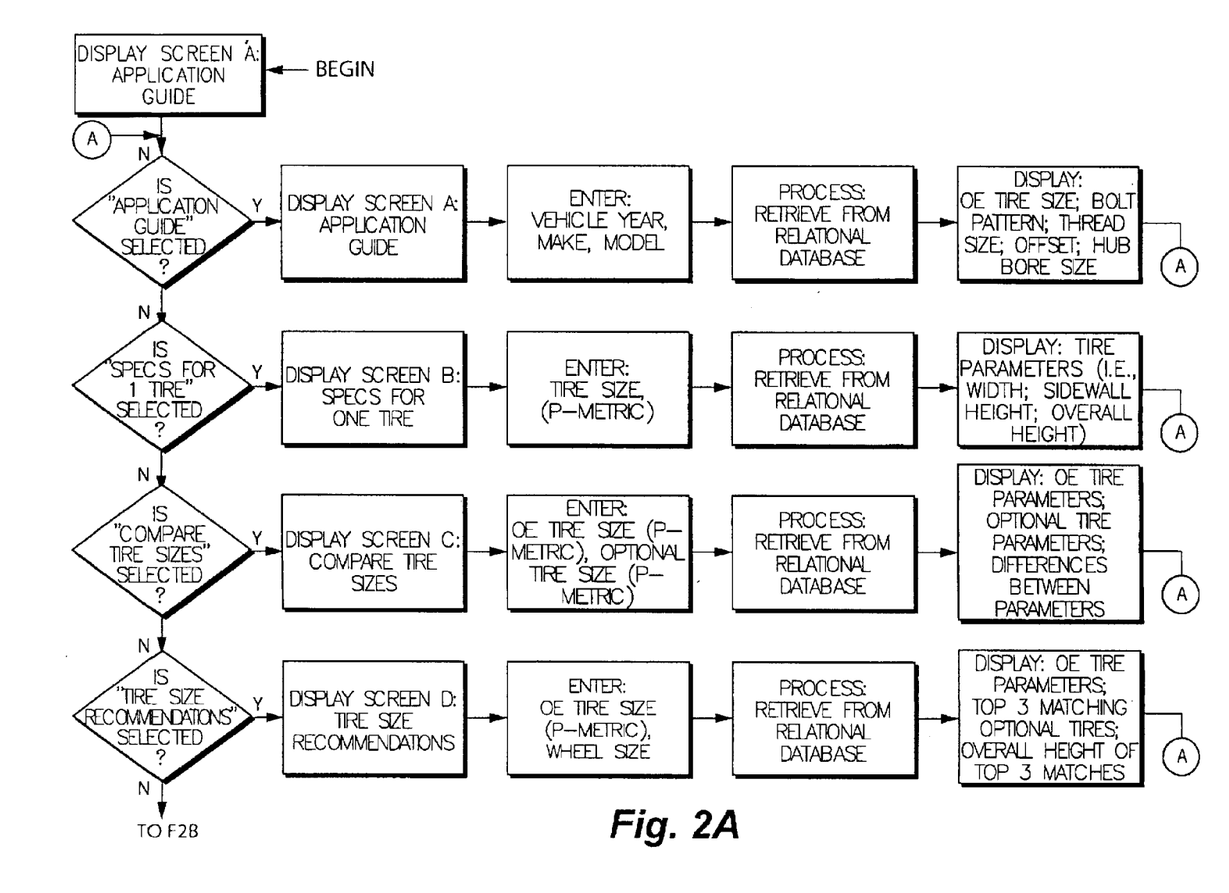
FIGS. 2A and 2B show a flow chart for the computer program.
Figure 2B:
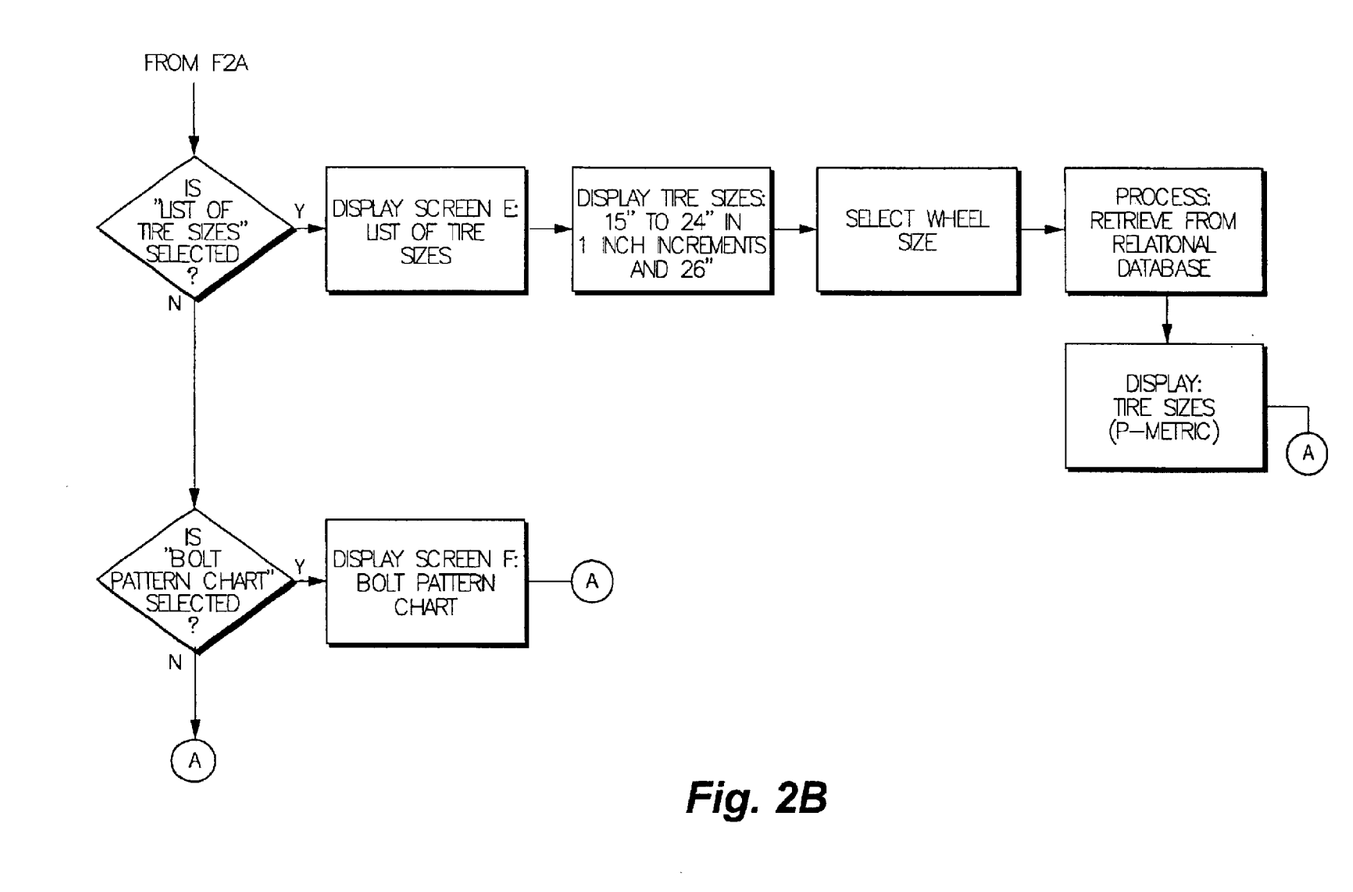

FIGS. 2A and 2B show a flow chart of the various steps that the software program follows. Upon startup of the program, the first screen, entitled "Application Guide" appears on the display monitor. The user can select among any of the six possible screens at any time while the program is in use. The software continuously checks whether the user has selected any of the six screens and displays the appropriate screen accordingly. The individual screens will be discussed individually as follows, with reference to this flow chart.

Figure 3:
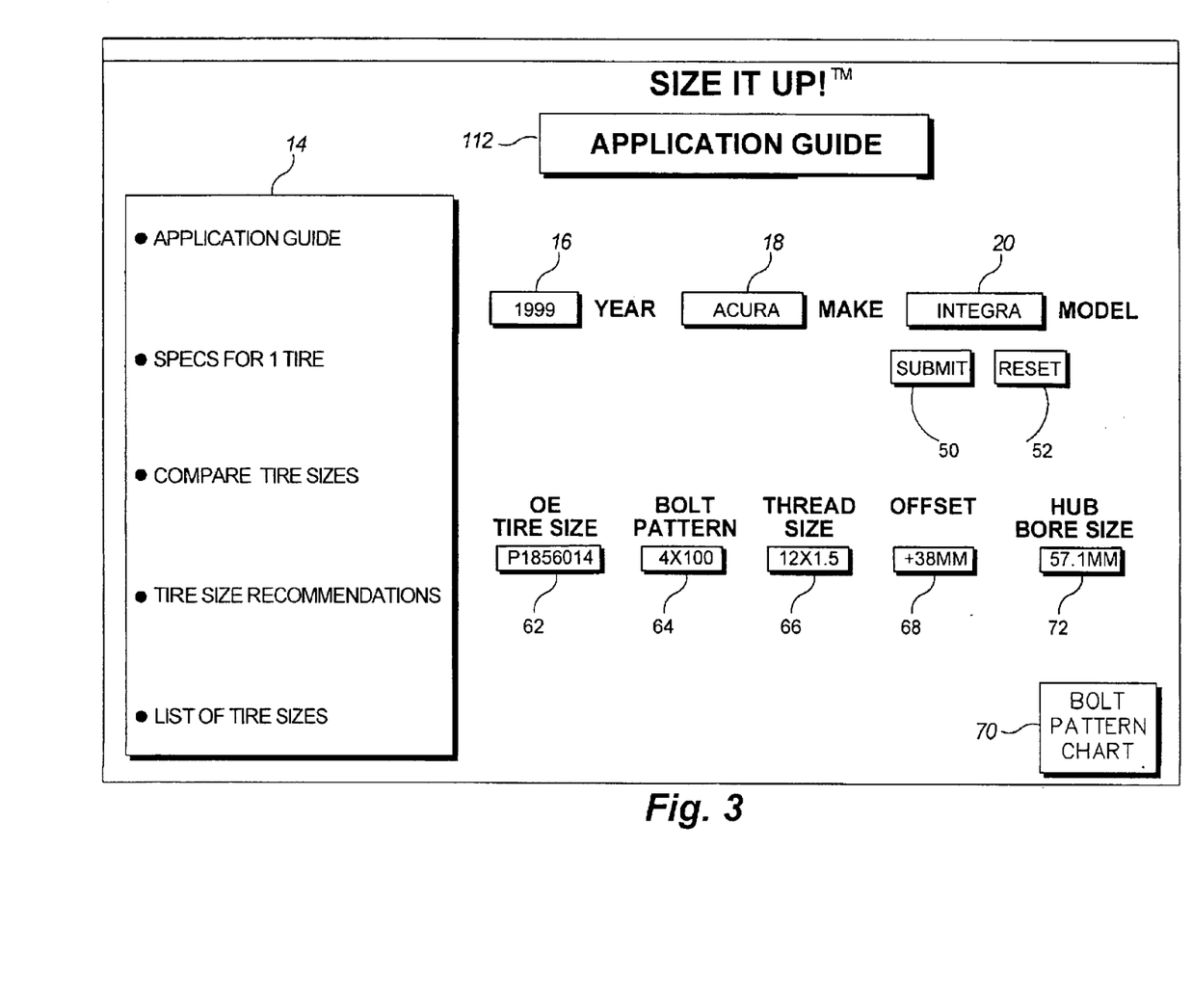
FIG. 3 shows the "Application Guide" screen.

FIG. 3 shows the first display screen named "APPLICATION GUIDE" 12. (SIZE IT UP! is a trademark claimed by the present inventor.) The user enters data in the input fields 16, 18 and 20, corresponding to the year, make and model of the vehicle, respectively, and, after pressing the "SUBMIT" button 50, obtains information from output fields, 62, 64, 66, 68 and 72, corresponding to the original equipment (OE) tire size, bolt pattern, thread size, offset and hub bore size, respectively. The user can also select any of five of the six possible display screens from the screen selection box 14, or can select the sixth screen, by selecting the Bolt Pattern Chart button 70. Moreover, the data can be cleared by selecting the "RESET" button 52.

Figure 4:
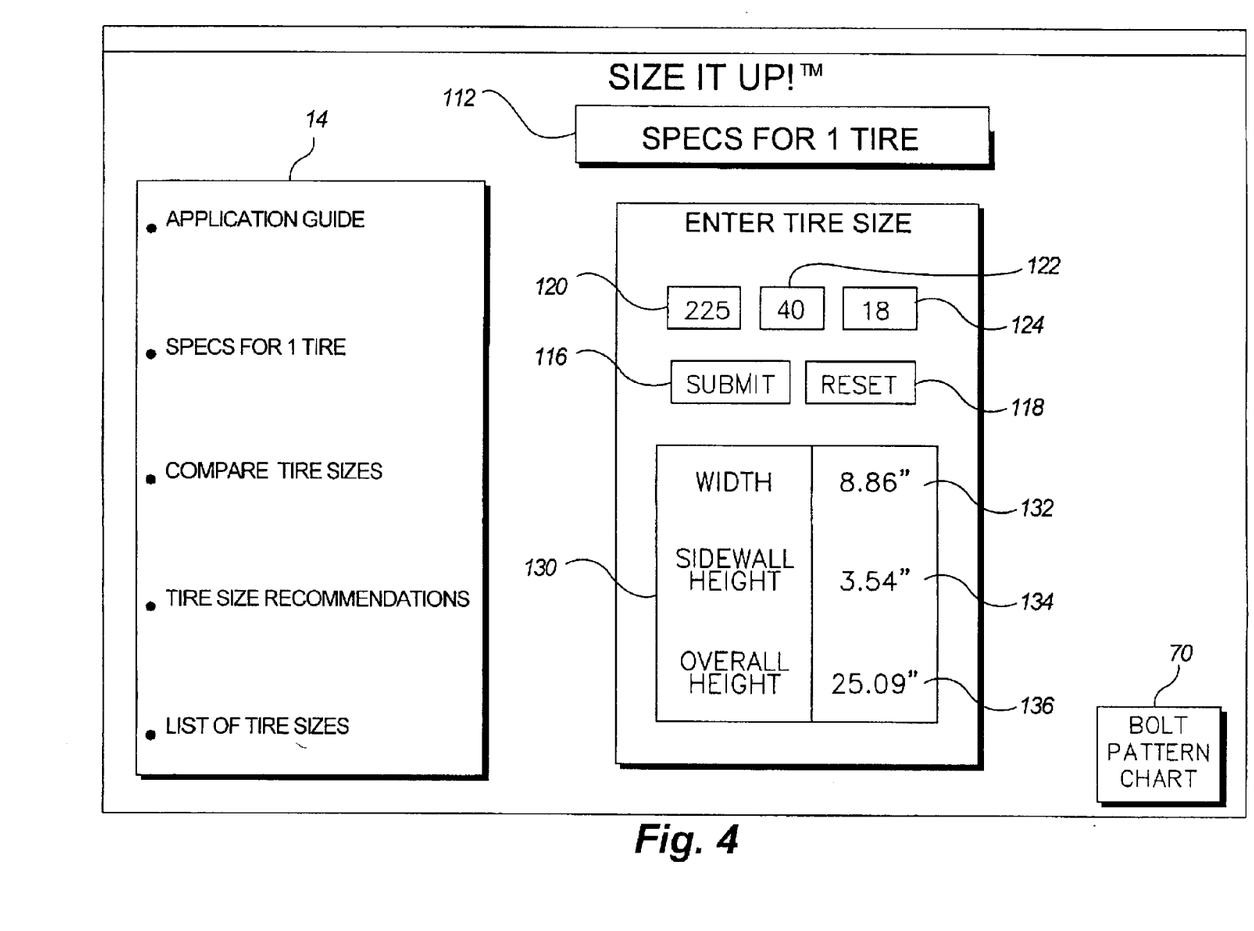
FIG. 4 shows the "Specs for 1 Tire" screen.

FIG. 4 shows the second display screen, entitled "SPECS FOR 1 TIRE" 112. The inputs in this screen include the tire size, obtained from the metric (or P-metric) and expressed as tire width (mm) 120, aspect ratio (ratio of tire section height to section width, expressed as a percentage) 122, and wheel diameter (inches) 124. Pressing the "SUBMIT" button 116 causes the output to be provided in box 130. The output includes the tire width 132, sidewall height 134, and overall height 136, all expressed in inches. A "RESET" button 118 is also provided in this screen to clear input data from the input fields.

Figure 5:
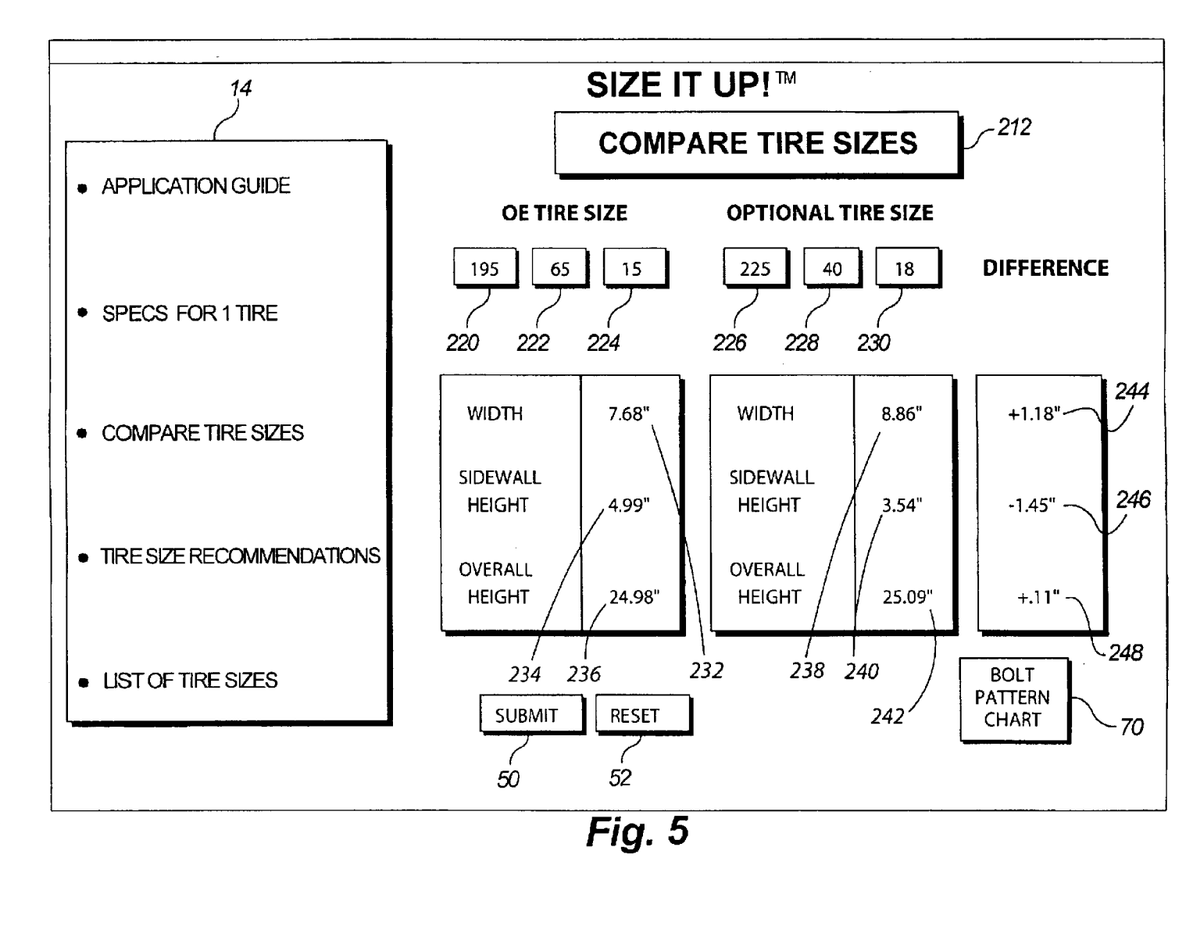
FIG. 5 shows the "Compare Tire Sizes" screen.

FIG. 5 shows the third display screen, entitled "COMPARE TIRE SIZES" 212. The input fields 220, 222, 224, 226, 228 and 230 correspond to the original equipment (OE) tire size and optional tire size, obtained from the corresponding metrics. The outputs include the width, 232 and 238, sidewall height, 234 and 240, and overall height, 236 and 242, for the OE tire and optional tire, and the difference in width, sidewall height and overall height, 244, 246 and 248, respectively. The output data are all provided in units of inches. A "SUBMIT" 50 and "RESET" 52 button are again provided.

Figure 6A:
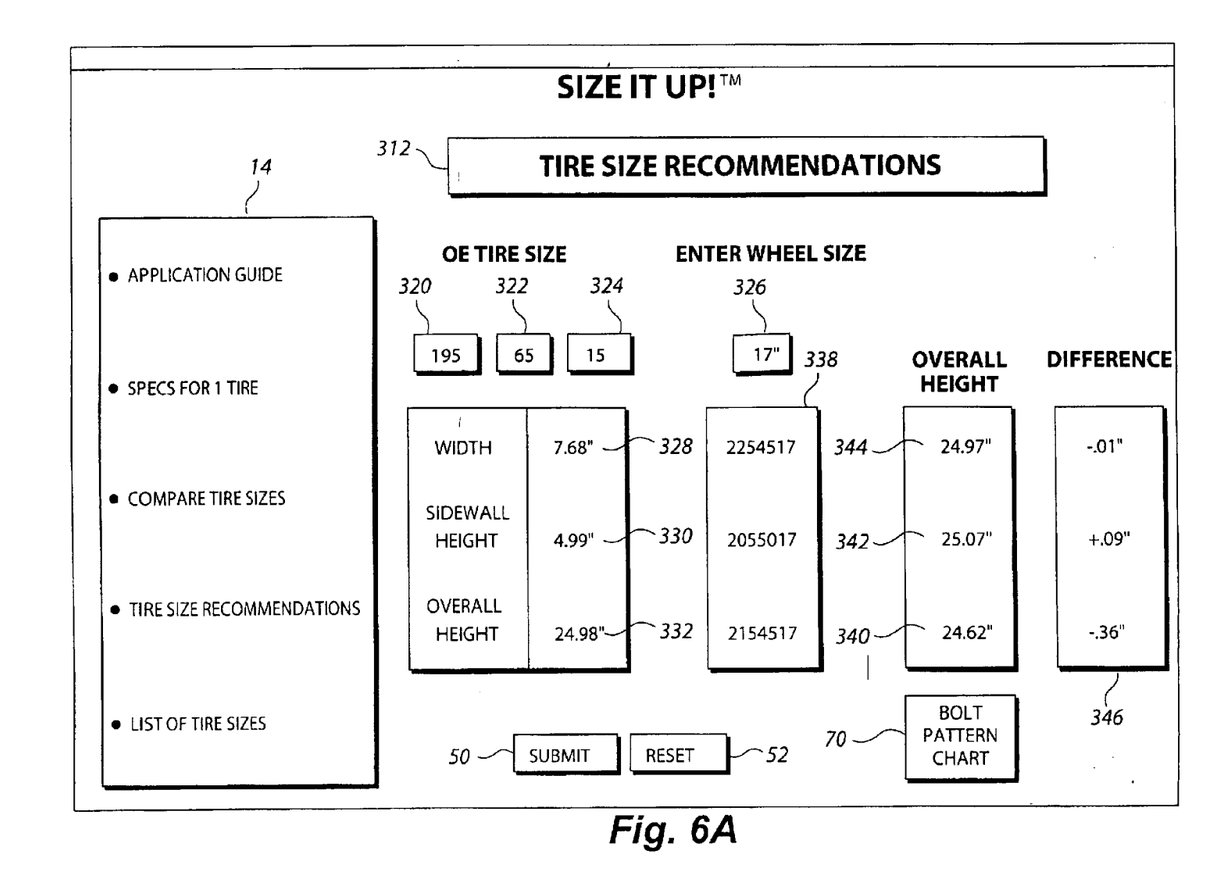
FIG. 6A shows the "Tire Size Recommendations" screen.

FIG. 6A shows the fourth display screen which provides a user interface for the portion of the program which determines possible matching tire sizes for a given OE tire size and a desired wheel size, the display screen being entitled "TIRE SIZE RECOMMENDATIONS" 312. The input test boxes include the OE tire size, 320, 322 and 324 and the desired wheel size 326.

The output includes the width, sidewall height and overall height, 328, 330 and 332, for the OE tire size, respectively, and three tire sizes 338 that most closely match the required overall tire height and desired wheel size, expressed in metrics format. Also, the overall height for the three tires, 340, 342 and 344, is displayed, together with a text box 346 which displays the difference between the overall tire and wheel height 332 of the original equipment tire and wheel, and the overall tire and wheel height 340, 342, 344 of the recommended plus-size tires used with the desired wheel size 326. Again, "RESET" 52 and "SUBMIT" 50 buttons are provided.

The overall height of a tire in all cases can be calculated using a well-known formula from the metric or P-metric. For example, for a tire size designated as P2256015, the first three digits (in this case, 225) represent the width of the tire in millimeters. The next two digits (in this case, 60) represents the aspect ratio of the sidewall in percent, i.e., the ratio of the sidewall (section) height to tread (section) width expressed as a percentage. The last two digits (in this case, 15) represent the wheel diameter in inches. The presence of the letter "R" in the metric between the last two sets of numbers would indicate that the tire is a radial tire. Also, the initial letter "P" can instead be the letters "LT" to designate a "light truck". Some light trucks can be plus-sized as well. In the case of European tires, the letter "P" is omitted from the metric, but the three sets of values in the metric are the same as for the "P-metric".

In order to determine the tread width expressed in inches, the first set of digits (in the above example, this value is 225) is divided by 25.4 mm/inch to get 8.85 inches for the above example. The sidewall height (also known in the art as the section height) can be determined by multiplying the tread width by the aspect ratio to get 5.31 inches in this case. Then multiplying by 2 and adding the wheel diameter (15), the overall tire height can be obtained in inches, i.e., 25.62 inches in this case. It will be understood that the tire plus-sizing computer program of the present invention may either calculate tread width 328, sidewall height 330, and overall height 332 each time a user submits the form of FIG. 6A, or may look up previously calculated data for the OE tire size which is stored in tables on the database 100.

Figure 6B:
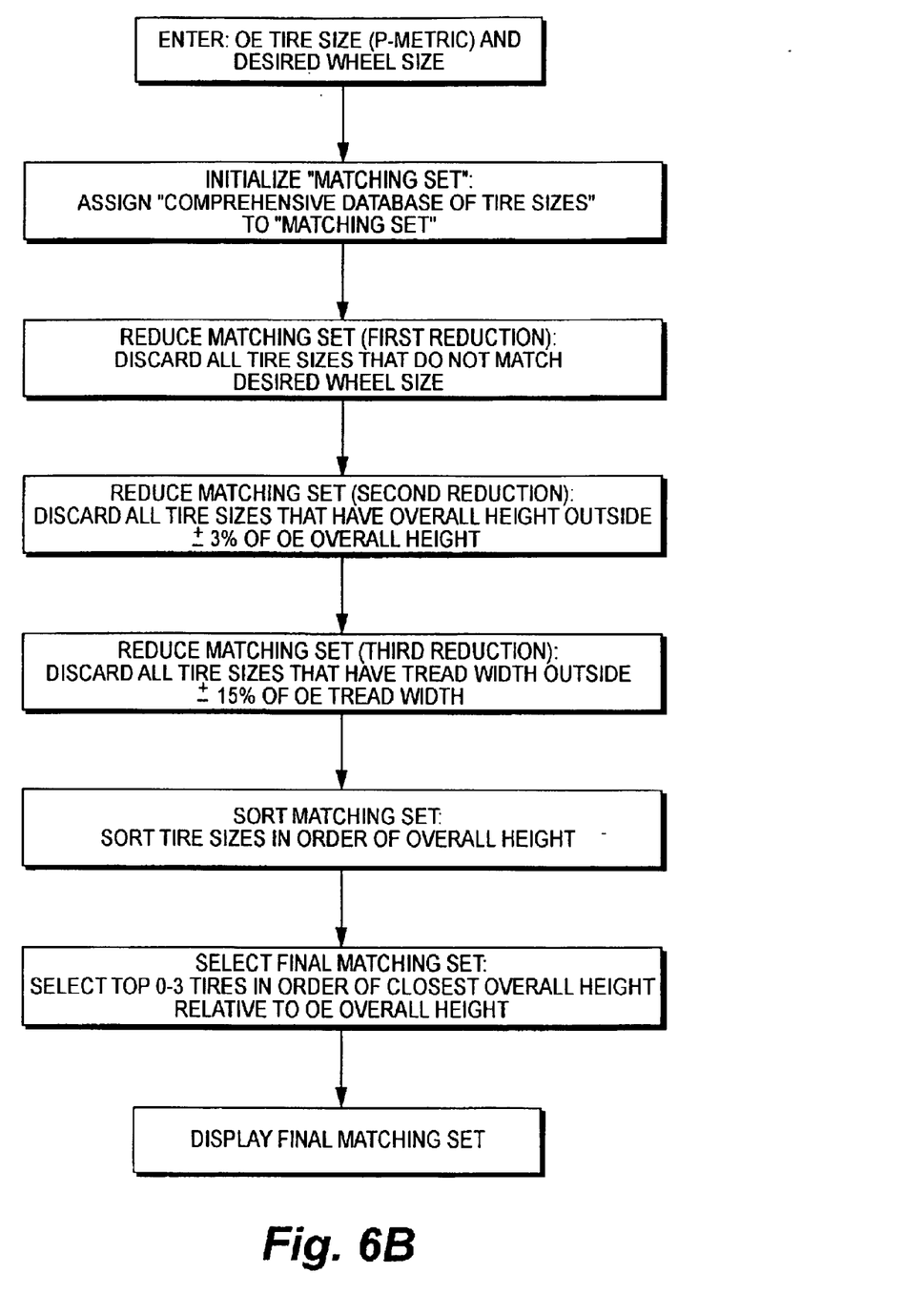
FIG. 6B shows a flow chart of a software routine for recommending tire sizes according to the present invention.

Once the input fields of OE tire size and desired wheel size have been entered in the screen of FIG. 6A, the routine described by reference to the flow chart shown in FIG. 6B is then used by the software to screen the database in order to determine up to three of the most closely matching tire sizes that correspond to the given OE tire size entered in text boxes 320, 322, 334 and the desired wheel size entered in text box 326 shown in FIG. 6A.

The tire selection routine is as follows:

a) Initialization: assign comprehensive tire size database to matching tire size set, thereby obtaining an initial working tire size database;

b) First data reduction: discard from the matching tire size set all tire sizes in which the wheel size does not match the desired wheel size, thereby obtaining a first reduced matching tire size set;

c) Second data reduction: discard from the first reduced matching tire size set all tire sizes in which the overall tire height is outside the range of ±3% of the OE overall tire size, thereby obtaining a second reduced matching tire size set;

d) Third data reduction: discard from the second reduced matching tire size set all tire sizes in which the tread width is outside the range of ±15% of the OE tire tread width, thereby obtaining a third reduced matching tire size set;

e) Sorting: sort all tire sizes in third reduced matching tire size set to obtain a sorted set of tire sizes arranged in order of decreasing overall tire height; and, f) Final selection and display: select up to three of the tire sizes in the sorted set having the closest overall tire height relative to the OE overall tire height and display the results using metrics or P-metrics as shown in FIG. 6A.

It will be understood that although the above routine has been described as a sequential series of steps for purposes of illustration, it will be obvious to those skilled in the art that by using a relational database, one or more structured query language (SQL) queries may be formed listing each step as a criteria in the query so that a plurality of the foregoing steps, or even all of the steps, may be performed simultaneously rather than sequentially.

Figure 7:
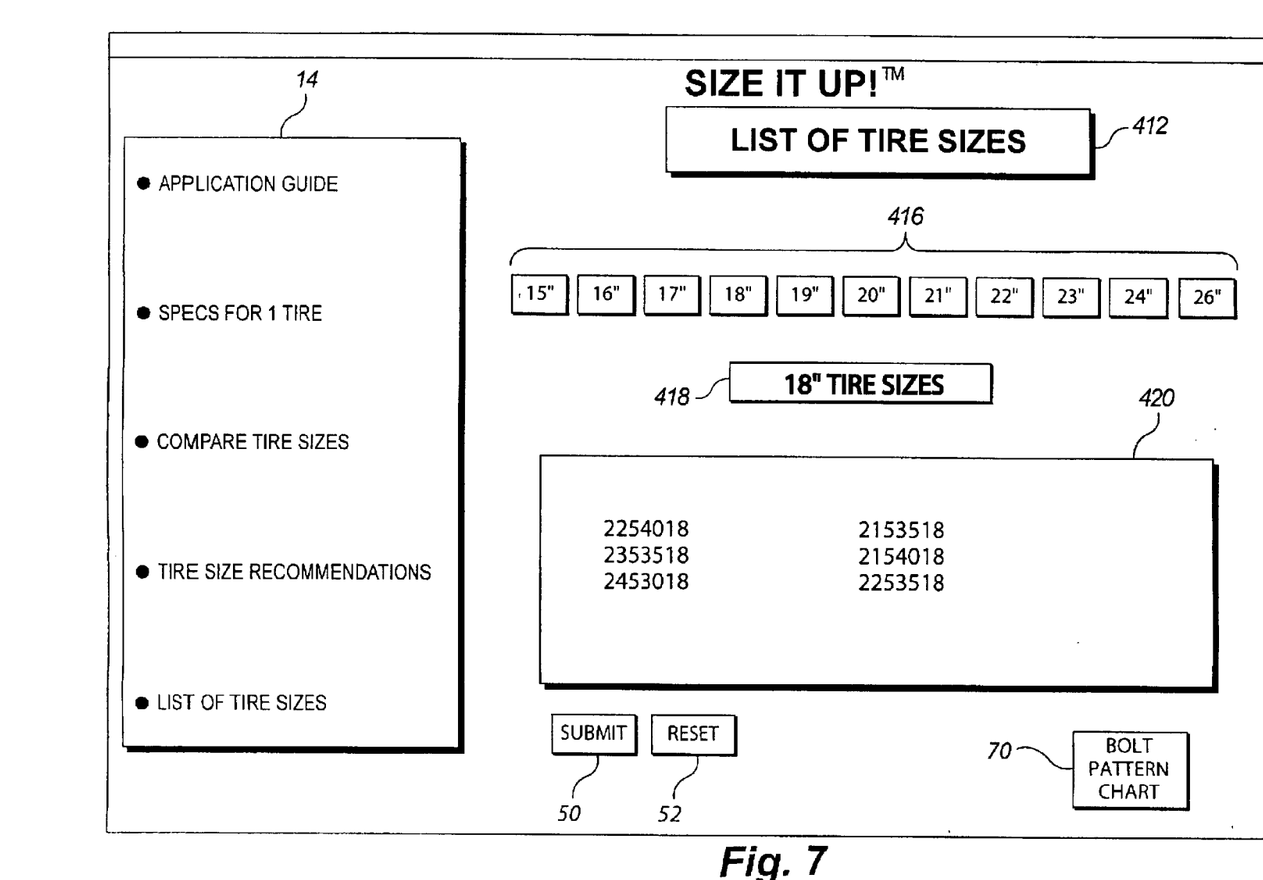
FIG. 7 shows the "List of Tire Sizes" screen.

FIG. 7 shows the fifth display screen, entitled "List of Tire Sizes" 412. In this screen, the user selects a tire size from a set 416 of tire sizes arranged horizontally, ranging from 15" to 24" in one-inch increments. FIG. 7 shows the results 420 for a 17" wheel 418. The results in this case is a list of the metrics for the six tires in the database that correspond to the selected wheel size. "RESET" 52 and "SUBMIT" 50 buttons are again provided.

Figure 8:
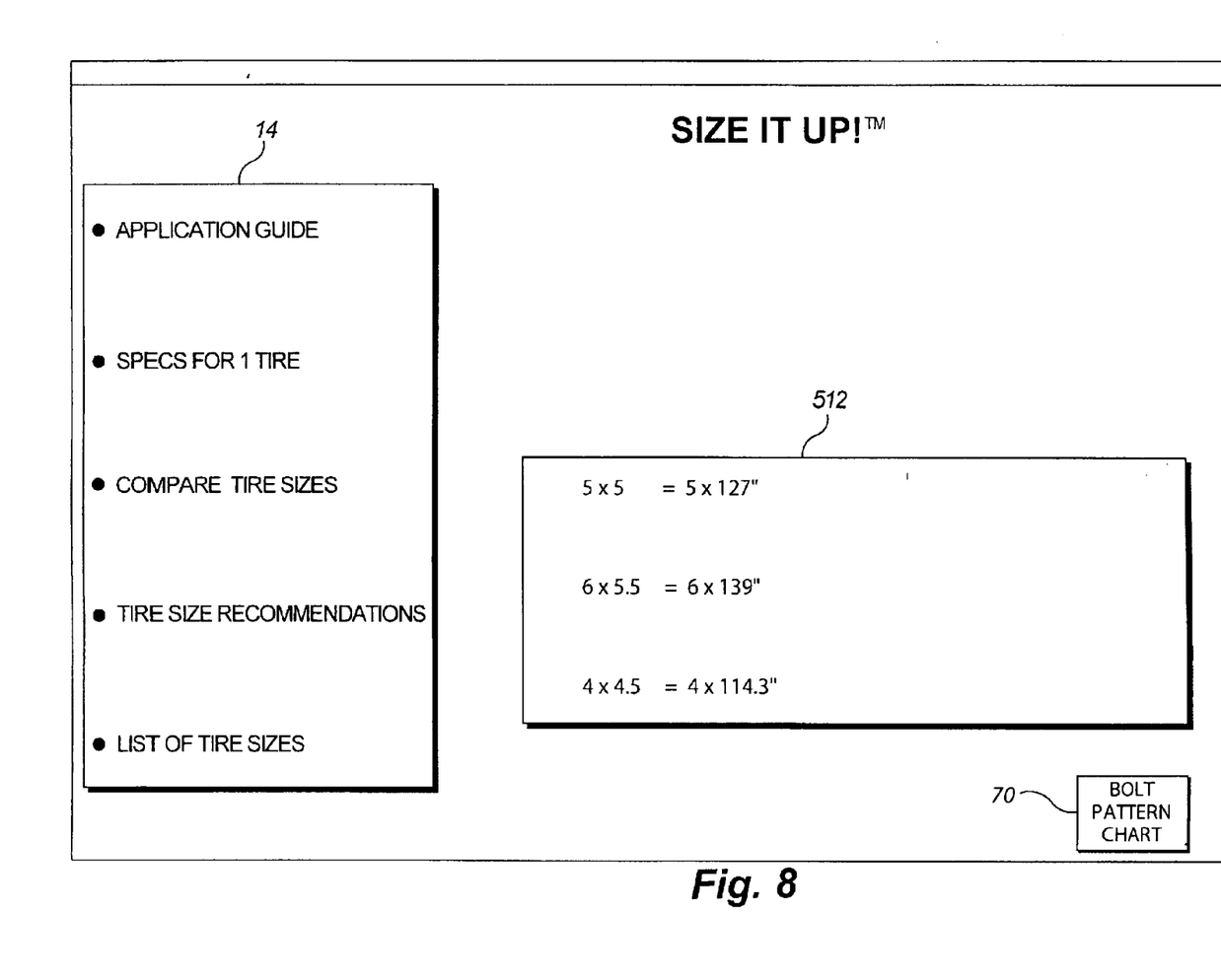
FIG. 8 shows the "Bolt Pattern" screen.

FIG. 8 shows the sixth display screen, corresponding to the available bolt patterns 512. The results are expressed in inches and corresponding values in millimeters.

In addition to use on the Internet, the software program can also be provided as a stand-alone program that can be installed onto a desktop or laptop personal computer or onto a personal data assistant, e.g., PALM PILOT.

The tire plus-sizing computer program may be written in any appropriate software language, including Java, C, C++, Visual Basic, Fortran, Cobol, HTML, XML, etc. A scripting language, such as JavaScript; PERL, etc., may be used to parse input forms and query the database in Web-based versions of the software program. A relational database, such as Oracle, Access, etc., may be used to store tire size and wheel specification data.

It is to be understood that the present invention is not limited to the embodiments described above, but encompasses any and all embodiments within the scope of the following claims.

I claim:

1. A tire plus-sizing computer program product comprising a medium readable by a processor, the medium having stored thereon:

(a) a first sequence of instructions which, when executed by the processor, causes the processor to display a screen having input boxes for receiving data input by a user identifying an original equipment tire size and identifying a desired wheel size;

(b) a second sequence of instructions which, when executed by the processor, causes the processor to access a database record for the original equipment tire size and to display a tread width, sidewall height, and overall height stored in the record;

(c) a third sequence of instructions which, when executed by the processor, causes the processor to retrieve a plurality of database records for tire sizes having a wheel size equal to the desired wheel size, an overall height within a range of 3% less than the original equipment tire size overall height to 3 greater than the original equipment tire size overall height, and a tread width within a range of 15% less than the original equipment tread width to 15% greater than the original equipment tire size tread width;

(d) a fourth sequence of instructions which, when executed by the processor, causes the processor to sort the records retrieved in the third sequence in order of decreasing overall height; and (e) a fifth sequence of instructions which, when executed by the processor, causes the processor to select and display up to three tire sizes from the sorted records having an overall height closest to the overall height of the original equipment tire size.

2. The tire plus-sizing computer program product according to claim 1, wherein said medium further has stored thereon:

(a) a sixth sequence of instructions which, when executed by the processor, causes the processor to display a screen having input boxes for receiving data input by a user identifying a vehicle by make model and year; and (b) a seventh sequence of instructions which, when executed by the processor, causes the processor to access a database record for the vehicle and to display specifications for the vehicle, including original equipment tire size, lug bolt pattern, lug thread size, wheel offset, and hub bore size.

3. The tire plus-sizing computer program product according to claim 1, wherein said medium further has stored thereon:

(a) an eighth sequence of instructions which, when executed by the processor, causes the processor to display a screen having input boxes for receiving data input by a user identifying a desired tire size by metric; and (b) a ninth sequence of instructions which, when executed by the processor, causes the processor to access a database record for the tire size and to display tread width in inches, sidewall height in inches, and overall height in inches.

4. The tire plus-sizing computer program product according to claim 1, wherein said medium further has stored thereon:

(a) a tenth sequence of instructions which, when executed by the processor, causes the processor to display a screen having input boxes for receiving data input by a user identifying both the original equipment tire size and a desired plus-size tire size; and (b) an eleventh sequence of instructions which, when executed by the processor, causes the processor to access database records for the original equipment and plus-size tire size and to display a comparison of tread width in inches, sidewall height in inches, and overall height in inches, and to calculate and display a differential in the tread width, sidewall height and overall height.

5. The tire plus-sizing computer program product according to claim 1, wherein said medium further has stored thereon:

(a) a twelfth sequence of instructions which, when executed by the processor, causes the processor to display a screen having input boxes for receiving data input by a user identifying a wheel size; and (b) an thirteenth sequence of instructions which, when executed by the processor, causes the processor to access a plurality of database records for tire sizes and to display a list of the records having the wheel size input by the user.

6. A computerized method for determining a plus-size tire for a vehicle, comprising the steps of:

(a) providing a database having a plurality of records of tire sizes stored thereon;

(b) displaying a screen having input boxes for receiving data input by a user identifying an original equipment tire size and identifying a desired wheel size;

(c) accessing the database and retrieving a record for the original equipment tire size;

(d) displaying a tread width, sidewall height, and overall height stored in the record retrieved in step (c);

(e) retrieving a plurality of the records for tire sizes having a wheel size equal to the desired wheel size, an overall height within a range of 3% less than the original equipment tire size overall height to 3% greater than the original equipment tire size overall height, and a tread width within a range of 15% less than the original equipment tread width to 15% greater than the original equipment tire size tread width;

(f) sorting the records retrieved in step (e) in order of decreasing overall height; and (g) selecting and displaying up to three tire sizes from the sorted records having an overall height closest to the overall height of the original equipment tire size.

7. The computerized method according to claim 6, further comprising the steps of:

storing a plurality of records in the database for vehicles, each record having an original equipment tire size for a different one of the vehicles;

displaying a screen having input boxes for receiving data input by a user identifying a vehicle by make model and year; and accessing a record in the database for the vehicle and to display specifications for the vehicle, including original equipment tire size, lug bolt pattern, lug thread size, wheel offset, and hub bore size.

8. The computerized method according to claim 6, further comprising the steps of:

displaying a screen having input boxes for receiving data input by a user identifying a desired tire size by metric; and accessing a record in the database for the tire size input by the user and displaying tread width in inches, sidewall height in inches, and overall height in inches from the record.

9. The computerized method according to claim 6, further comprising the steps of:

displaying a screen having input boxes for receiving data input by a user identifying both the original equipment tire size and a desired plus-size tire size; and accessing records in the database for the original equipment and plus-size tire size and displaying a comparison of tread width in inches, sidewall height in inches, and overall height in inches from the records; and calculating and displaying a differential in the tread width, sidewall height and overall height.

10. The computerized method according to claim 6, further comprising the steps of:

displaying a screen having input boxes for receiving data input by a user identifying a wheel size; and accessing a plurality of records in the database for tire sizes and displaying a list of the records having the wheel size input by the user.

11. A system for selecting plus-size tires, comprising:

(a) at least one server computer having a processor, an area of main memory for executing program code under the direction of the processor, a storage device for storing data and program code, and a bus connecting the processor main memory and the storage device;

(b) at least one relational database accessible by said server computer, the database having stored therein a plurality of records for tire sizes;

(c) a data communications device connected to said bus for connecting said server computer to a network; and (d) a web-based tire plus-sizing computer program code stored in said storage device and executing in said main memory under the direction of said processor, the computer program including:

(i) web server software means for publishing at least one web site on the network;

(ii) means for receiving at the web site data input by a user identifying an original equipment tire size and identifying a desired wheel size;

(iii) means for accessing the database and retrieving a record for the original equipment tire size;

(iv) means for publishing a web page displaying a tread width, sidewall height, and overall height stored in the record for the original equipment tire size;

(v) retrieving means for retrieving a plurality of the records for tire sizes having a wheel size equal to the desired wheel size, an overall height within a range of 3% less than the original equipment tire size overall height to 3 greater than the original equipment tire size overall height, and a tread width within a range of 15% less than the original equipment tread width to 15% greater than the original equipment tire size tread width;

(vi) means for sorting the records retrieved by said retrieving means in order of decreasing overall height; and (vii) means for selecting up to three tire sizes from the sorted records having an overall height closest to the overall height of the original equipment tire size and for publishing a web page displaying the up to three tire sizes.

12. The system for selecting plus-size tires according to claim 11, wherein said database further comprises a plurality of records stored in said database for vehicles, each record having an original equipment tire size for a different one of the vehicles, the computer program further comprising:

means for receiving at the web site data input by a user identifying a vehicle by make, model and year; and means for accessing a record in the database for the vehicle and for publishing a web page displaying specifications for the vehicle, including original equipment tire size, lug bolt pattern, lug thread size, wheel offset, and hub bore size.

13. The system for selecting plus-size tires according to claim 11, wherein the computer program further comprises:

means for receiving at the web site data input by a user identifying a desired tire size by metric;

means for accessing a record in the database for the tire size input by the user; and means for publishing a web page displaying tread width in inches, sidewall height in inches, and overall height in inches from the record for the tire size input by the user.

14. The system for selecting plus-size tires according to claim 11, wherein the computer program further comprises:

means for receiving at the web site data input by a user identifying both the original equipment tire size and a desired plus-size tire size;

means for accessing records in the database for the original equipment and plus-size tire size and publishing a web page displaying a comparison of tread width in inches, sidewall height in inches, and overall height in inches; and means for calculating and publishing a web page displaying a differential in the tread width, sidewall height and overall height.

15. The system for selecting plus-size tires according to claim 11, wherein the computer program further comprises:

means for receiving at the web site data input by a user identifying a wheel size; and means for accessing a plurality of the records in the database for tire sizes and for publishing a web page displaying a list of the records having the wheel size input by the user.

16. The system for selecting plus-size tires according to claim 11, wherein said data communications device is connected to the Internet.

17. The system for selecting plus-size tires according to claim 11, wherein said data communications device is connected to an intranet.

18. The system for selecting plus-size tires according to claim 11, wherein said data communications device is connected to an extranet.

\* \* \* \* \*